April 17, 1951 — H. McCULLY — 2,549,503
RULE ATTACHMENT
Filed March 1, 1946
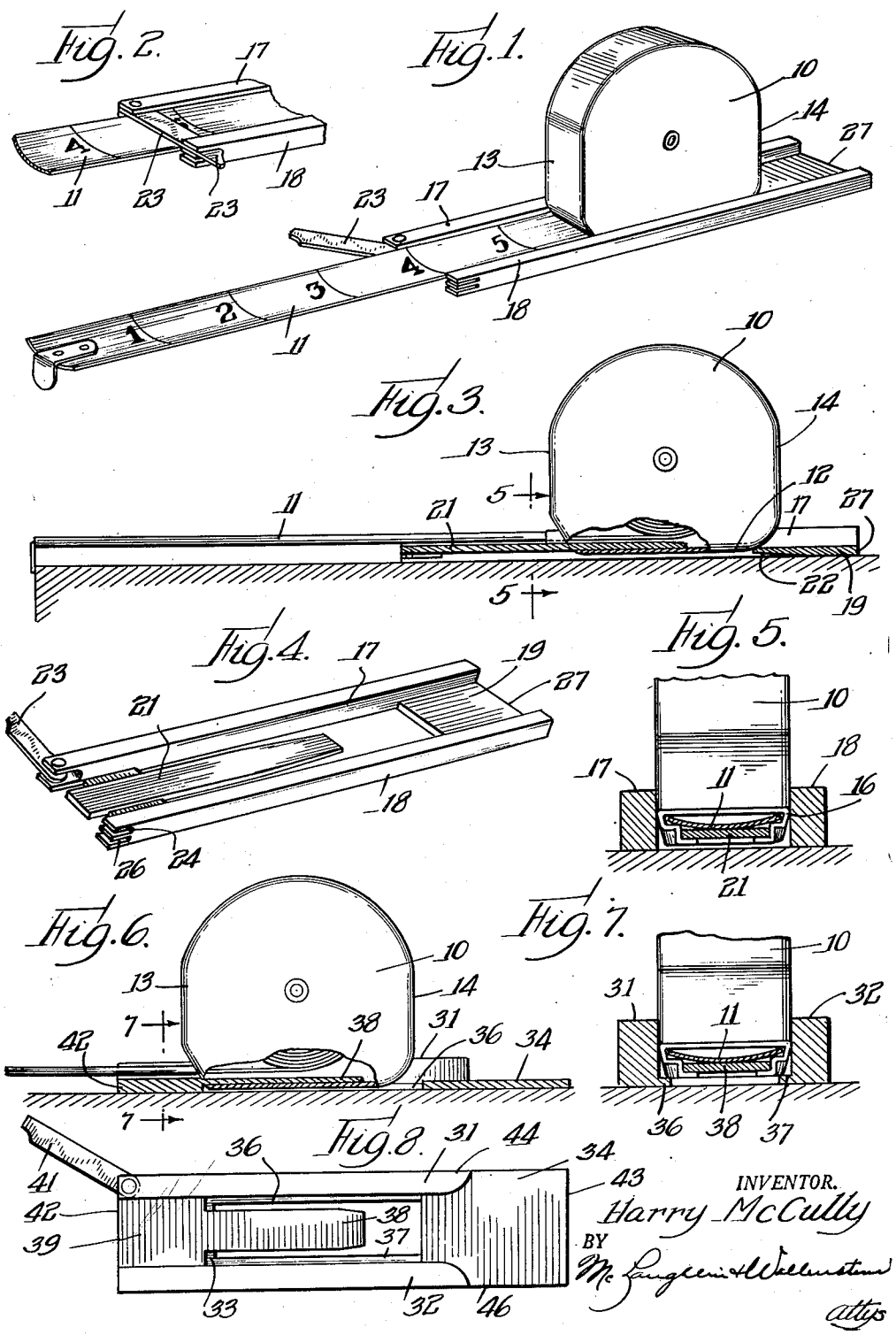
INVENTOR.
Harry McCully Patented Apr. 17, 1951

2,549,503

UNITED STATES PATENT OFFICE 2,549,503

RULE ATTACHMENT

Harry McCully, Chicago, Ill.

Application March 1, 1946, Serial No. 651,174

6 Claims. (Cl. 33—138)

My invention relates to an attachment for rules of the metal tape type.

Where a relatively long rule is employed under conditions requiring measurement of both relatively short and relatively long distances, the common practice is to use either a folding rule or a tape coiled in a housing and projectable therefrom a varying distance.

In recent years, metal tape rules have come into use and have, in part, supplanted folding rules, as well as cloth tape rules. While in some respects, the metal tape device has advantages over both the cloth tape and folding rule, its use is limited for various reasons. For one thing, the metal tape device must be used with the case in an upright position so that the numbers can be read and accurate positioning of the case maintained. This is particularly important from an accuracy standpoint when inside measurements are made because under such circumstances the length of the case must be added to the indicated measurement. For this reason, cases used with metal measuring tapes are generally provided with a flat bottom and flat perpendicular peripheral portions in the longitudinal direction with respect to the tape. The flat bottom is not adequate to hold the rule in an upright position; and while the two flat peripheral portions are designed to permit easy reading and the addition to the reading of a standard figure (commonly two inches), the measurement is at times difficult to read and the exact positioning of the rear edge of the case is also difficult. The metal measuring tape also suffers, in certain instances, when contrasted with the folding rule, in that the latter facilitates the drawing of lines for layout work and the like such as lines parallel to the direction in which the measurement is taken and lines running directly at right angles thereto. Frequently, also, the metal measuring tape cannot be used by a single person and a correct measurement obtained, and for certain types of measurements use of the metal measuring tape is not only difficult but results in inaccuracies.

The principal object of my invention is to provide an attachment for a metal measuring tape rule, or sliding rule as it is sometimes called.

Another object is to improve the use and overcome some of the disadvantages of the measuring tape type of rule discussed hereinabove.

Still another object is to provide a support for the case of a measuring tape type of rule capable of supporting it in an upright position, capable of being readily attached thereto or detached therefrom, and providing improved advantages in measuring accuracy, for the drawing of lines and generally to improve the all-round usefulness of the sliding tape rule.

I secure the objects of my invention by the provision of an attachment comprising a frame with a bottom supporting surface having a relatively great surface area, the frame projecting both longitudinally and laterally from the case, with means for supporting the case in an upright position on the frame so that tape, when withdrawn, will lie along a top surface thereof and with means utilizable for securing the tape immovably in any position to which it may be withdrawn. Preferably, the means for supporting the case on the frame includes a centrally disposed tongue insertable into the case, under the metal measuring tape where it is frictionally held against accidental removal. When the metal case is provided with a flat bottom, above which the measuring tape is guided, the supporting tongue preferably lies intermediate the top and bottom surfaces of the frame so that the bottom of the case is supported slightly away from a surface on which the frame may be supported. In one form of attachment, the frame is reversible to provide spaced side rails projecting downwardly a considerable distance below the case so as to be supportable upon and adjustable to a rounded surface such as the top of a pipe, whereby to increase the usefulness of the rule.

Other features and objects of the invention will be apparent from the detailed description of preferred embodiments of the invention as illustrated in the drawings.

In the drawing:

Fig. 1 is a perspective view showing the case attachment applied to the case and the measuring tape partially withdrawn in a position in which it would normally be used;

Fig. 2 is a fragmentary view of a portion of Fig. 1 illustrating the manner in which a clamp is utilized to fasten the tape in position;

Fig. 3 is a side elevational view, partially broken away, and showing the manner in which the rule and attachment are employed on a top outside surface;

Fig. 4 is a perspective view of the attachment shown in Figs. 1 and 3 with the case removed to show details of construction;

Fig. 5 is a fragmentary sectional view, partly in elevation, taken along the line 5—5 of Fig. 3, looking in the direction of the arrows;

Fig. 6 is a view similar to Fig. 3, but showing a slight modification of the rule attachment;

Fig. 7 is a transverse sectional view, partly in elevation, taken along the line 7—7 of Fig. 6, looking in the direction of the arrows; and Fig. 8 is a plan view of the rule attachment shown in Fig. 6, but with the rule case removed therefrom.

My invention is shown as applied to a rule comprising a rule case 10 and steel tape rule 11 coiled therein but extensible therefrom in a manner known in the art. I have shown in the drawing, a rule of the type sold by the Lufkin Rule Co., of Saginaw, Michigan, under the trade name "Mezurall," but those skilled in the art will understand that other commercial rules may be utilized with my attachment, either with no modification thereof or such minor modifications as may be necessary to perform the intended functions as will be explained.

The case of the type of rule disclosed has a flat bottom 12 and parallel vertical periphal surfaces 13 and 14, which conventionally are formed two inches apart so that if one were to read a measurement by sighting downwardly along the surface 13, and the measurement had actually been from the surface 14 (for example, on an inside measurement) two inches would be added to the figure obtained in order to have the right measurement. A guide 16 for the tape is provided slightly above the bottom surface and when the tape is withdrawn its slight transverse bevel tends to hold it in substantially a straight line so long as the concave portion of the bevel faces upwardly. The tape is freely coiled, however, when bent toward this concave portion and is freely coiled and returned to the case by various means with which my invention is not in any way concerned. My invention preferably is for use with a rule having a metal case and in which the metal tape is bevelled or dished transversely, as shown. So far as such rules may have modified features of operation and construction, however, my invention is not concerned therewith.

Looking now to the attachment of my invention, it provides a frame having side rails 17 and 18, a connecting web portion 19 at one end thereof and an attaching tongue 21 supported between the rails in the manner clearly shown in Fig. 4. In this form of the invention, the frame is reversible in a manner and for a purpose which will be described and the attaching tongue 21, slightly tapering, is intermediate the top and bottom surfaces of the frame but closer to the bottom surface (when looking at Fig. 4) than to the top surface. The web 19 has the major portion of its exterior surface in the same plane as the bottoms of the rails 17 and 18, as clearly shown in Fig. 3, but is provided with a slight bevel portion 22, the function of which will be explained. The top surface of the web 19 is slightly below the tongue 21, so that to secure the case 10 in the position shown in Fig. 3, it is merely sufficient to place the bottom 12 of the case along the top surface of the web 19 and move it toward the end of the tongue 21, whereby to cause the tongue to be inserted within the case in the position shown in Fig. 5, but underneath the metal tape 11. If necessary, the tongue which is somewhat flexible may be forced down slightly with the finger, in the act of insertion, to guide it into the opening below the guide 16 and under the tape. When so mounted in position, the case may be supported in an upright position by merely setting the entire frame on a flat surface in the manner shown in Fig. 3.

Toward the front portion of the attachment, I pivot a clamp 23 in a bifurcated portion at the end of the rail 17. The corresponding end of the rail 18 is provided with a pair of slots 24 and 26 immediately above and immediately below the tongue 21. The clamp 23 is so pivoted that it may be raised or lowered vertically so that it can be inserted in either the slot 24 or the slot 26, as desired.

It will be noted that the rear edge 27 of the web 19 forms, with ends of the rails 17 and 18, a straight edge and this straight edge is at right angles to side edges of the rails 17 and 18 which are made parallel to each other. It will be noted from Fig. 2, also, that when the clamp 23 is closed, there is a straight edge across the rule formed by a relatively thin member so that visibility in reading the measurement is enhanced. The ends of the rails 17 and 18 are also coincident with each other and parallel to the edge 27. Since the tape lies closely between the rails 17 and 18 and the case is so supported that the tape, if drawn straight out, is parallel to the side edges of the rails, it is easy to read the division on the scale at the ends of the rails 17 and 18, even if the clamp 23 is not used. The distance between the front edge and rear edge of the attachment is fixed, preferably, exactly four inches, so that when a measurement is read at the front edge of the attachment and the actual measurement was taken to the rear edge 27, four inches are added to obtain the true measurement. Since, however, the measurement is to a fixed edge, the exact position of which is easily observed, very great accuracy is obtained.

It will be noted that even though the case may be moved with respect to the frame, an accurate measurement will still be obtained. The attachment is constructed, nevertheless, so that if properly applied, it will always have a fixed predetermined position with respect to the case. If, through improper use, the case should slip with respect to the frame the accuracy of the reading is not affected. The clamp 23 provides sufficient friction so that the tape will definitely be held in any position to which it may be adjusted with respect to the attachment.

When used as shown in Fig. 1, the attachment is particularly suitable for measuring along flat surfaces. In Fig. 3, for example, the tape is hooked over an edge in a customary manner and measurement is made to the rear edge 27. The actual reading, however, is taken along the front edge and four inches are added. If it is desirable for layout purposes, or the like, a line may be drawn along the rear edge 27 or along any of the other exterior edges of the attachment, or, for that matter, a series of lines, using the attachment itself as a straight edge for ruling purposes while at the same time using the tape for measuring purposes.

If the tape is to be used for measuring along a pipe, for example, the position of the case with respect to the attachment is reversed. By setting the bottom of the case along the lowermost surface of the web 19, forcing the tongue slightly toward the case and sliding the case along the bevelled portion 22, the case may be attached in a position reversed to that shown in Fig. 3 so that there is a much greater vertical distance between the bottom surfaces of the rails and the bottom surface of the case. The surfaces of the rails which are shown upwardly in Figs. 4 and 5, would then be facing downwardly and the rails can then engage along the top of a rounded surface, such as of a pipe, but the bottom surface of the case 10 can be out of contact therewith. In this manner the case can be held substantially in an upright position on the top of a pipe or other rounded surface, and I have found that adjustment to curves of various radii automatically takes place, and the case may lie as much as fifteen or twenty degrees either side of center around the circumference of a pipe or the like but it will still not be dislodged. Thus, in many instances where sliding rules could be used only with great difficulty, a rule equipped with my attachment is readily employed, and accurate, dependable results quickly obtained.

The device shown in Figs. 6 to 8, inclusive, is substantially the same as shown in the preceding embodiment except that there is no provision for reversal to adapt the device for support on a rounded surface. In this form of the invention, there is a pair of rails 31 and 32 with webs 33 and 34 coincident with the bottom surfaces of the rails, and also coincident with a pair of side projections 36 and 37. An attaching tongue 38 is carried by a web portion 39 secured in position by welding, brazing or the like, which thereby supports the tongue 38 slightly above the web portions 33 and 34 and above the side projections 36 and 37. The case can, therefore, be readily attached by placing it along the top surface of the web 34 and sliding it toward the web 33, the attaching tongue 38 thereby entering the case below the tape in the same manner described in connection with the preceding embodiment. A clamp 41 is also provided in a bifurcated end of the rail 31 and is engageable in a suitable end slot in the rail 32. It will be noted that a relatively very large area bottom surface is provided for the support of the attachment and that the rails 31 and 32 are short of the extreme limits of the web 34 so that much greater visibility is obtained while still assuring adequate support. The bottom of the case is supported slightly above the bottom surface and the side projections 36 and 37 engage against side edges of the case to support and maintain it in the desired position. In this form of the invention, there is a full forward edge 42 and a rear edge 43, parallel to each other, and at right angles to the parallel side edges 44 and 46, formed as a continuation of the side rails and web 34. The manner of using the device shown in Figs. 6-8, inclusive, is the same as previously described with the exception that this particular form of device is not so adaptable to use on curved surfaces.

The rule attachment of my present invention improves accuracy, saves time, and offers a distinct advantage where lay out of work, drawing of lines and the like, are required. It offers a distinct advantage where inside measurements are to be made and narrow recesses have to be carefully gauged. There are many details and advantages which those skilled in the art will readily ascertain.

What I claim as new and desire to protect by Letters Patent of the United States:

1. An attachment for a rule of the class comprising a case and measuring tape coiled therein, comprising a frame with a bottom supporting surface extending longitudinally and laterally beyond the case, and means for supporting said case in an upright position on said frame so that the tape when withdrawn will lie along a top surface of the frame, said means including an attaching tongue adapted to extend into the case under the said metal tape, whereby said case is readily supportable in an upright position with the tape lying along a surface to be measured.

2. An attachment for a rule of the class comprising a case and measuring tape coiled therein, comprising a frame with a relatively large area bottom supporting surface, and means for supporting said case in an upright position on said frame so that the tape when withdrawn will lie along a top surface of the frame, said means including an attaching tongue adapted to extend into the case under the said metal tape, whereby said case is readily supportable in an upright position with the tape lying along a surface to be measured.

3. An attachment for a rule of the class described, said attachment comprising a pair of parallel side rails, at least one web between the rails, and an attaching tongue supported between the rails for insertion into a rule case below a metal tape, said case being thereby supported between said rails with the rails and web forming a flat supporting surface and the frame defining parallel side straight edges and end straight edges perpendicular to said side edges.

4. An attachment for a rule of the class described, said attachment comprising a pair of parallel side rails, at least one web between the rails, and an attaching tongue supported between the rails for insertion into a rule case below a metal tape, said case being thereby supported between said rails with the rails and web forming a flat supporting surface and the frame defining parallel side straight edges and end straight edges perpendicular to said side edges, said tongue being closer to one side of the frame than to the other.

5. An attachment for a rule of the class described, said attachment comprising a pair of parallel side rails, at least one web between the rails, and an attaching tongue supported between the rails for insertion into a rule case below a metal tape, said case being thereby supported between said rails with the rails and web forming a flat supporting surface and the frame defining parallel side straight edges and end straight edges perpendicular to said side edges, and a tape clamp along one end edge of the frame.

6. An attachment for a rule of the class comprising a case and measuring tape coiled therein, comprising a frame with a bottom supporting surface extending longitudinally and laterally beyond the case, said frame including a pair of side rails, a tongue supported between the rails for insertion into the case below the tape, said case being thereby supported between said rails with the tongue forming a support for that part of the measuring tape adjacent the case when said measuring tape is withdrawn from the case.

HARRY McCULLY.

REFERENCES CITED

The following references are of record in the file of this patent:

UNITED STATES PATENTS

| Number | Name | Date |
|---|---|---|
| 961,599 | Franchini | June 14, 1910 |
| 1,106,152 | McIntosh | Aug. 4, 1914 |
| 1,245,704 | Gowrie | Nov. 6, 1917 |
| 1,259,886 | McLeod | Mar. 19, 1918 |
| 1,690,919 | Baine | Nov. 6, 1928 |
| 1,725,476 | Poppock | Aug. 20, 1929 |
| 1,968,919 | Wanee | Aug. 7, 1934 |
| 2,065,143 | Metcalf | Dec. 22, 1936 |

FOREIGN PATENTS

| Number | Country | Date |
|---|---|---|
| 78,653 | Sweden | July 18, 1931 |